(12) United States Patent
Salters et al.

(10) Patent No.: US 8,930,424 B2
(45) Date of Patent: *Jan. 6, 2015

(54) DATA STORAGE SYSTEM AND METHOD FOR PROTECTING THE SYSTEM IN CASE OF POWER-FAILURE

(75) Inventors: Michiel Salters, Delft (NL); Walter Slegers, Eindhoven (NL); Jan Willem Van Den Brand, Eindhoven (NL)

(73) Assignee: TomTom International B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/383,257

(22) PCT Filed: Jul. 10, 2009

(86) PCT No.: PCT/EP2009/058829
§ 371 (c)(1),
(2), (4) Date: Feb. 20, 2012

(87) PCT Pub. No.: WO2011/003464
PCT Pub. Date: Jan. 13, 2011

(65) Prior Publication Data
US 2012/0173595 A1    Jul. 5, 2012

(51) Int. Cl.
G06F 7/00       (2006.01)
G06F 17/30      (2006.01)
G06F 11/14      (2006.01)

(52) U.S. Cl.
CPC ...... *G06F 17/30227* (2013.01); *G06F 11/1441* (2013.01)
USPC ....................................... 707/822

(58) Field of Classification Search
None
See application file for complete search history.

(56) References Cited

U.S. PATENT DOCUMENTS 7,676,702 B2 * 3/2010 Basham et al. ............. 714/47.1
2004/0078704 A1 * 4/2004 Malueg et al. ................. 714/42

OTHER PUBLICATIONS

Steven Whitehouse, "The GFS File system" 2007 Linux Symposium, vol. Two, pp. 253-259.*
XP002573889—C. Frost et al, "Generalized File System Dependencies" Oct. 2007 Retrieved from the Internet: URL: http://delivery.acm.org/10.1145/1300000/1294291/p307-frost.pdf?key1=1294291&key2=0528988621&coll=GUIDE&dl=GUIDE&CFID=82448291&CFTOKEN=29358913>[Retrieved on Mar. 18, 2010].
XP002573890—C.P.Wright, "Operating System Support for Extensible Secure File Systems", May 2004 Stony Brook University Retrieved from the Internet: URL:http://citeseerx.ist.psu.edu/viewdoc/download?doi=10.1.1.80.5956&rep=rep1&type=pdf> [retrieved on Mar. 18, 2010].
XP002512190—Josef Sipek et al, "Kernal Support for Stackable File Systems", Proceedings of the Linux Symposium, Ottawa, Ontario, Canada, [Online] Jul. 27, 2007 Retrieved from the Internet: URL:http://ols.108.redhat.com/2007/Reprints/sipek-Reprint.pdf> [retrieved on Jul. 27, 2007].
International Search report issued Mar. 30, 2010 for International Application No. PCT/EP2009/058829.

* cited by examiner

Primary Examiner — Uyen Le

(57) ABSTRACT

A data storage system includes a data storage device with a first file system of a first type. At least one file stored in the first file system comprises a second file system of a second, different type. The data storage system is configured to write data to the second file system in a power-safe manner.

16 Claims, 10 Drawing Sheets

DATA STORAGE SYSTEM AND METHOD FOR PROTECTING THE SYSTEM IN CASE OF POWER-FAILURE

This application is the National Stage of International Application No. PCT/EP2009/058829, filed Jul. 10, 2009 and designating the United States. The entire content of this application is incorporated herein by reference.

BACKGROUND TO THE INVENTION

The present invention relates to a data storage system and method, and in particular to a system and method comprising or relating to mass data storage devices. The invention has particular application to data storage devices which may be subject to power interruption, for example arising from removal from an associated device or power failure of the associated device.

Almost all electronic devices require memory for data storage. Flash memory devices have become increasingly commonly used either as permanently installed internal data storage devices or as removable data storage devices, for example memory cards.

File Allocation Table (FAT) based file systems are commonly used for both embedded and removable data storage devices. FAT systems are particularly useful for removable data storage devices as they are supported by most operating systems used in personal computers, and thus present few interoperability or compatibility issues.

A FAT file system stores a file allocation table on the data storage device, which identifies where each file is stored at the hardware level of the data storage device, by mapping hardware level elements, referred to as clusters, to each stored file. The file allocation table also stores other information concerning the stored files, the file system, and the hardware level structure, in the form of metadata.

If power failures occur, then FAT systems are not safe. The relationship between file contents and file metadata, as well as the internal consistency of the file system may be damaged by a power failure, for example if the power failure occurs during a write operation. Furthermore, earlier versions of FAT file systems cannot cope with long file names, and those later versions that can cope with long file names do so in a relatively inefficient manner.

Some electronic devices monitor power levels and ensure a safe shutdown if power is close to being exhausted. However, even in the case of such devices, problems can occur if a removable data storage device is forcibly removed during a read or write operation, or if power failure occurs due to an unforeseen device or component failure.

Power failure problems can be particularly acute in an automotive environment, as power is often delivered by the vehicle battery to electronic devices associated with the vehicle. Examples of such electronic devices in an automotive environment include navigation devices, for example portable navigation devices (PNDs). The software, or other control system, of such electronic devices may have little or no control over the level of power delivered. For example, during an engine start, power can drop to dangerously low levels especially if the vehicle battery is old. That may cause corruption of data if a non-power fail safe file system, such as FAT, is used.

More generally, power failure problems can occur if an SD card, or any other removable memory device, is removed from a device or computer, for example a PC, whilst the SD card or memory device is being written to.

Some known file systems, for example Ext3, provide power fail safe journaling capabilities in which data to be stored by the file system is copied temporarily to a journal before being written to the location assigned by the file system. If a power failure occurs during a write procedure, a copy of data that is in the process of being written should be retained in the journal, and can be used to restore the correct data to the location assigned by the file system.

Other known file systems, for example ZFS, are power fail safe transactional file systems, in which existing data are not overwritten at the same physical location of a storage device by a new or amended version of the data. Instead, a set of writes of a new version of data is performed to a different location on the storage device than the area at which the previous version of the data is stored. The set of writes is usually written to free space on the storage device. The reference to the location of the data is then changed and the location of the previous version of the data is marked as free. The set of writes can be referred to as a transaction.

However, power fail safe journaled or transactional file systems are less prevalent than non-journaled or non-transactional file systems such as FAT, and can present significant compatibility and interoperability issues. That can present particular problems in the case of removable data storage devices, which may be required to be compatible with a wide variety of electronic devices or operating systems.

It is known to use combinations of file systems and, for example, to embed one file system inside another using a loopback arrangement. For example, in Linux Live CDs, a read-only Joliet file system is provided in combination with a further RamFS file system. The RamFS file system operates as a read/write layer over the CD's Joliot file system whilst in operation but is not power-fail-safe and anything stored in RamFS is lost when the RAM is not powered.

In another example, it is known to hold an Ext2 or Ext3 file system inside an NTFS file system on a personal computer, for example as provided in a VMWare Linux image. The user is able to read and write data freely from or to either the Ext2/Ext3 or NTFS file system in the personal computer.

In certain circumstances the use of combinations of file systems, particularly in loopback arrangements, can lead to the loss of certain functionality (for example, correct journaling) of one or other of the file systems or to unreliable operation of the file systems.

SUMMARY OF THE INVENTION

In a first independent aspect of the invention there is provided a data storage system comprising:—a data storage device that comprises a first file system of a first type, wherein at least one file stored in the first file system comprises a second file system of a second, different type; and a file system control means for controlling file system operations on the file systems, wherein the file system control means is configured to write data to the second file system in a power-fail-safe file manner.

By providing such a system, a file system having desired characteristics (for example compatibility with a particular operating system) can be provided whilst still providing for power-fail-safe operation.

By writing in a power-fail-safe manner it can be ensured that power failure during a write operation to the file system does not cause corruption of the file system, or that any such corruption is recoverable by the file system.

The file system control means may be a file system multiplexer that is configured to distribute file system operations over the different file systems in dependence on at least one predetermined condition. The file system control means may be a file system controller.

The file system control means may be configured to receive requests for write operations to the first or second file systems and to direct write operations to the second file system in response to substantially all, or all, such requests received by the file system control means for write operations to the first or second file systems. The file system control means may be configured to write to the second file system in response to substantially all such requests. Thus, power-fail-safe operation may be obtained for substantially all, or all, write operations.

The file system control means may be configured to perform file write operations on the second file system in response to substantially all requests received by the file system control means to write files to the first or second file systems.

The requests may be requests to write data to a union or combination of the first and second file system, or to a virtual file system comprising the first and second file systems.

The file system control means may be configured to redirect write operations intended for the first file system to the second file system. The write operations may be write operations to be performed on files stored in the first file system.

The at least one file comprising the second file system may comprise a loopback file. By the at least one file comprising the second file system comprising a loopback file is meant either that the at least one file may be a loopback file or that the at least one file may include a loopback file The at least one file may comprise a block device.

The system may be configured so that no amendments to metadata included in the first file system are made by file system operations of the second file system.

The file system control means may be configured to operate so that a recoverable copy of data to be written to the second file system is maintained until the data has been successfully written to the second file system on the data storage device.

Data may be written to the second file system by writing data to the at least one file in the first file system that comprises the second file system, and the file system control means may be configured to operate so that the ordering of data to be written to the second file system is maintained when writing to the at least one file in the first file system.

The second file system may be a journaled file system and the control means may be configured to maintain the ordering of journal operations of the second file system when writing to the at least one file comprising the second file system.

In operation, journal transactions comprising journal data and metadata may be written to a journal in the second file system, and the control means may be configured to control writing to the at least one file comprising the second file system so that for each journal transaction the journal data is written to the journal before journal metadata representative of the completion of the journal transaction is written to the journal.

The data storage system may be arranged to operate so that data is written to the first file system on the data storage device via a page cache, and the first file system may be configured to operate so that each amended page in the page cache that is to be written to the first file system and/or second file system is flushed from the page cache to the data storage device before any further amended pages to be written to the first file system and/or second file system are written to the page cache. The first file system may be configured to operate in synchronous mode.

The data storage system may be arranged to operate so that data is written to the first file system on the data storage device via a page cache, and the file system control means may be configured to ensure that there is no queue of two or more pages to be written to the first or second file system in the page cache.

The file system control means may be configured to issue a write command for the first file system in response to each closure of a file for storage in the second file system.

The first file system, of the first type, may be a non-power-fail-safe file system. The first file system, of the first type may be a non-journaled file system.

The second file system may be a file system in which a recoverable copy of data to be written by a write operation is maintained by the file system until the data has been successfully written. The second file system, of the second type, may be a journaled or transactional file system.

The first file system may comprise a FAT-based file system and/or the second file system may comprise a journaled, Ext-based file system. The FAT-based file system may comprise one of a FAT, vFAT, FAT16, or FAT32 file system. The second file system may comprise an Ext3 file system or a successor to the Ext3 file system.

Alternatively, the first file system may comprise any other suitable type of file system, for example NTFS, and/or the second file system may comprise any other suitable type of file system.

Each of the first file system and the second file system may be writeable. The file system control means may be configured to receive a request for a write operation, and to direct the write operation to a selected one of the first and second file systems.

The write operation request may be a request to write a file and the file system controller may be configured to select one of the first and second file systems to which to direct the write operation in dependence on at least one property of the file and/or in dependence on the identity of the application or user that made the request.

The file system control means may be configured to write no long file names to the first file system.

It may be that none of the files stored in the first file system have long file names, or are within a directory or path that includes a long file name. By a long file name may be meant a file name longer than a predetermined length. A directory name may be considered to be a file name in the present context. A long file name may be a file name longer that an 8.3 file name. An 8.3 file name is a file name that has a name that is eight characters in length followed by an extension of 3 characters in length, usually separated from the name by a full stop. If either the name or extension of a file name is longer than eight or three characters respectively then that file name may be considered to be longer than an 8.3 file name. The system may be configured so that none of the files stored in the second file system have long file names.

The file system control means may be configured to partition data between the first file system and the second file system. Files may be partitioned between the first file system and the second file system in dependence on the length of the file names of the files. The file system control means may be configured to partition files between the first file system and the second file system in dependence on the length of the file names of the files.

The file system control means may be configured to write no or substantially no files with long file names to the first file system. The file system control means may be configured to write any files with long file names only to the second file system.

The file system control means may be configured to read data from both the first file system and the second file system, and to write data only to the second file system. In this context the term data may encompass metadata.

The file system control means may be configured to write user-modified data only to the second file system.

The file system control means may be configured to receive an instruction to write a file to the data storage device, to write the file to the second file system in response to the instruction, to determine whether the file had been read from the first file system, and to store metadata identifying that the file or versions of the file have been stored both in the first file system and the second file system.

The file system control means may be configured to maintain an administration file that comprises metadata representative of the partitioning of files between the first file system and the second file system.

The administration file may comprise metadata representative of whether files or versions of files are present in both the first file system and the second file system. Priority may be given to a file or version of a file stored in the second file system over a corresponding file or version of the file stored in the first file system.

The file system may be configured to store amendments to a file in the second file system, regardless of whether the file is stored in the first file system or the second file system.

The system may comprise means for deleting files or versions of files from the first file system that are stored, or versions of which are stored, both in the first file system and the second file system. The deletion means may delete files or versions of files in dependence on the stored metadata and/or the content of the administration file.

The file system control means may comprise mounting means for mounting the first file system and the second file system, and the mounting means may be configured to provide a combined mounting point for the first file system and the second file system.

The mounting means may be configured to provide a union of the first file system and the second file system. The mounting means may use the unionfs file system service to provide the union of the first file system and the second file system.

The mounting means may be configured to provide an application layer interface to the union of the first file system and the second file system.

The file system control means may be configured to provide a virtual file system comprising the first file system and the second file system.

The data storage device may comprise a mass data storage device. The data storage device may comprise a removable data storage device, for example a memory card. The memory card may be an SD card.

The data storage system may further comprise an operating system that comprises file system drivers for one of the first file system and the second file system, and the file system control means may comprise file system drivers for the other of the first file system and the second file system.

The operating system may be a standard personal computer operating system. The operating system may be a Windows or Mac OS X operating system.

The data storage device may be for use in an electronic device, and the file system control means may be provided in the electronic device and/or in a personal computer that is connectable to the electronic device.

Alternatively or additionally the file system control means may be provided in the electronic device. A file system control means may be provided in each of the electronic device and the personal computer. The file system control means may comprise software for installation in at least one of the personal computer and the electronic device. The electronic device may comprise a navigation device. The electronic device and/or the data storage device may be for installation in a vehicle and/or may be configured to be powered by a vehicle power system.

The first file system may be readable and writeable by a personal computer operating system, the system may further comprise an application installable on a personal computer, and the application may comprise file system components to enable the personal computer to read from and write to the second operating system.

The data storage device may comprise at least one of a flash data storage device and a hard disk.

In a further independent aspect of the invention there is provided a data storage device comprising a first file system of a first type, wherein at least one file stored in the first file system comprises a second file system of a second, different type. The second file system may be a power-fail-safe file system.

The at least one file comprising the second file system may comprise a loopback file. The second file system may comprise a journaled file system. The first file system may comprise a non-journaled file system.

The first file system may comprise a FAT-based file system and the system may be configured so that none of the files stored in the first file system have long file names.

In another independent aspect of the invention, there is provided a file system controller for controlling file system operations performed on a data storage device, wherein the data storage device comprises a first file system of a first type, at least one file stored in the first file system comprises a second file system of a second, different type, and the file system controller is configured to operate so that data is written to the second file system in a power-fail-safe manner. The second file system may be a power-fail-safe file system.

The file system controller may be configured to read data from both the first file system and the second file system, and to write data only to the second file system.

In another independent aspect of the invention there is provided a method of storing data comprising providing a first file system of a first type, providing at least one file in the first file system that comprises a second file system of a second, different type, and saving data to the second file system in a power-fail-safe manner. The second file system may comprise a power-fail-safe file system.

In a further independent aspect of the invention there is provided a computer program product comprising computer readable instructions that are executable to perform a method or to provide a file system controller as claimed or described herein.

Any feature in one aspect of the invention may be applied to other aspects of the invention, in any appropriate combination. In particular, apparatus features may be applied to method features and vice versa.

BRIEF DESCRIPTION OF THE DRAWINGS

At least one embodiment of the invention will now be described, by way of example only, with reference to the accompanying drawings, in which.

DETAILED DESCRIPTION OF EMBODIMENTS

Embodiments of the present invention will now be described, by way of example only. The described embodiments relate to data storage devices, and file system arrangements in such data storage devices.

Figure 1:
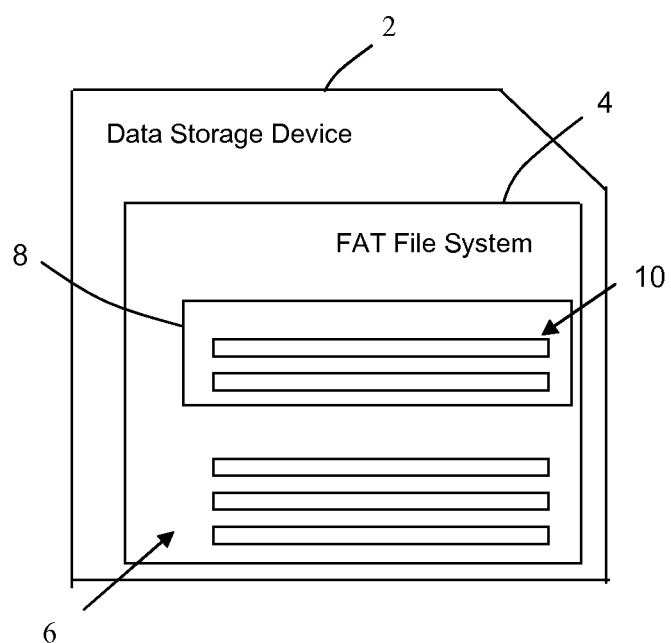
FIG. 1 is a schematic illustration of a data storage device according to one embodiment.

A data storage device 2 according to a first embodiment is illustrated in FIG. 1. The data storage device 2 is in the form of a 4 GB SD card comprises a FAT-file system 4 in which is stored a plurality of data and other files 6. A further file 8 is stored in the FAT file system 4. The further file 8 is a loopback file that comprises an Ext3 file system, which in turn comprises a plurality of data and/or other files 10.

The data storage device 2 may be inserted into an electronic device and used for data storage by the electronic device. In the embodiment of FIG. 1, the data storage device 2 is intended for use in a navigation device 20.

Figure 2:
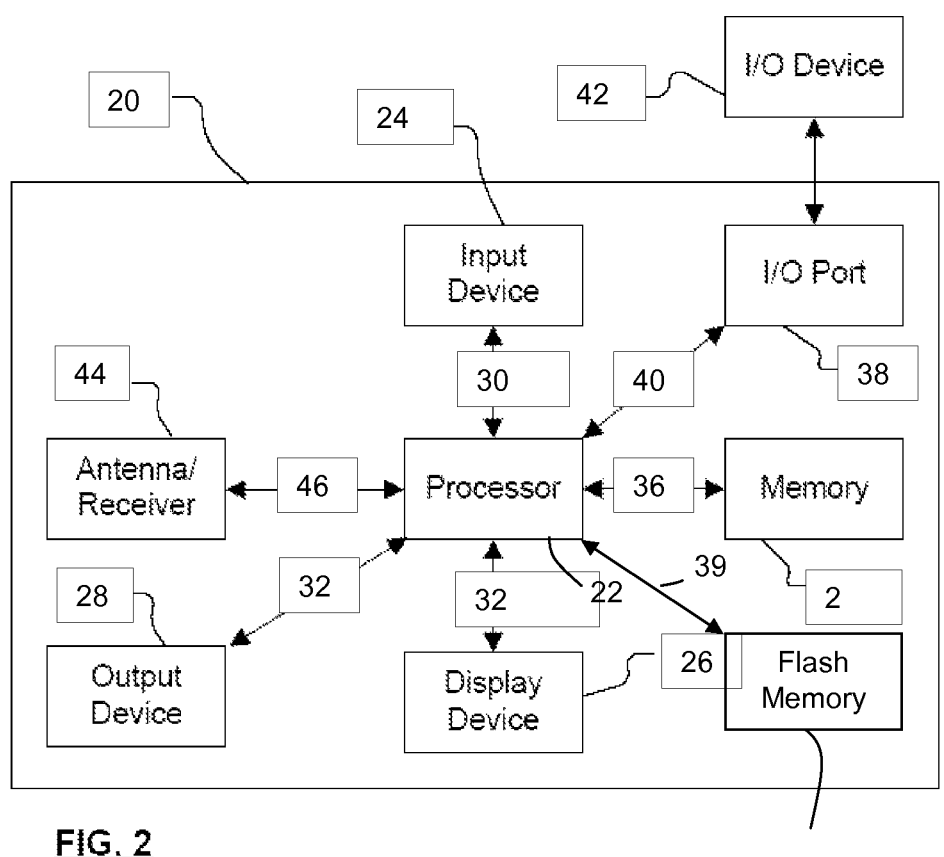
FIG. 2 is a schematic illustration of a navigation device.

The navigation device 20 is illustrated in FIG. 2, and will be described first, before the interrelation between the FAT file system and the Ext3 file system, the partitioning of data between the file systems and read/write operations to the file systems are described in more detail.

The navigation device 20 is located within a housing (not shown). The housing includes a processor 22 connected to an input device 24 and a display screen 26. The input device 24 can include a keyboard device, voice input device, touch panel and/or any other known input device utilised to input information; and the display screen 26 can include any type of display screen such as an LCD display, for example. In one arrangement the input device 24 and display screen 26 are integrated into an integrated input and display device, including a touchpad or touchscreen input so that a user need only touch a portion of the display screen 26 to select one of a plurality of display choices or to activate one of a plurality of virtual buttons.

The navigation device may include or be connected to an output device 28, for example an audible output device (e.g. a loudspeaker or vehicle radio). As output device 28 can produce audible information for a user of the navigation device 20, it should equally be understood that input device 24 can include a microphone and software for receiving input voice commands as well.

In the navigation device 20, processor 22 is operatively connected to and set to receive input information from input device 24 via a connection 30, and operatively connected to at least one of display screen 26 and output device 28, via output connections 32, to output information thereto. Further, the processor 22 is operably coupled to the data storage device 2 via connection 36 and to an internal Flash memory 37 (in this case a MoviNand device) via connection 39. The processor 22 is further adapted to receive/send information from/to input/output (I/O) ports 38 via connection 40, wherein the I/O port 38 is connectible to a further I/O device 42 external to the navigation device 20. The navigation device 20 also comprises a volatile memory (not shown) such as a Random Access Memory (RAM). The external I/O device 42 may include, but is not limited to an external listening device such as an earpiece for example. The connection to I/O device 42 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 20 and the internet or any other network for example, and/or to establish a connection to a server via the internet or some other network for example.

FIG. 2 further illustrates an operative connection between the processor 22 and a GPS antenna/receiver 44 via connection 46. The antenna/receiver 44 are combined schematically for illustration purposes but may be separately positioned components. The antenna can be, for example, a GPS patch antenna or helical antenna.

Figure 3:
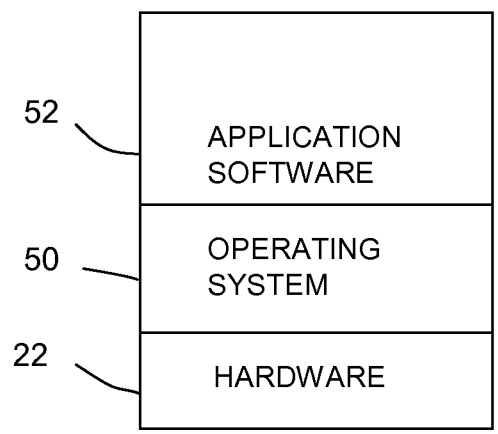
FIG. 3 is schematic representation of an architectural stack of the navigation device of FIG. 2.

Referring now to FIG. 3 of the accompanying drawings, the internal flash memory 37 stores a boot loader program that is executable by the processor 22 in order to load an operating system 50 from the internal flash memory 37 for execution by functional hardware components, which provides an environment in which application software 52 can run. The operating system 50 serves to control the functional hardware components and resides between the application software 52 and the functional hardware components. The application software 52 is also stored on the flash memory 37 and provides an operational environment including a GUI that supports core functions of the navigation device 20, for example map viewing, route planning, navigation functions and any other functions associated therewith. In variants of the described embodiment, the boot loader program, operating system 50 and/or the application software 52 are stored on the data storage device 2, and in some such variants no internal flash memory 37 is included in the device 20.

When the user switches on the device 20, the device 20 acquires a navigation signal. The location is calculated by a position determining module (not shown) included in the application software 52. The user is then presented with a view in pseudo three dimensions on the display 26 of the local environment in which the navigation device 20 is determined to be located, and in a region of the display 26 below or to the side of the local environment a series of control and status messages. The device 20 provides route planning, mapping and navigation functions to the user, in dependence on user input via a keypad (not shown) or other input device. In variants of the described embodiment, user input provided via a series of interlinked soft or virtual buttons and menu screens that can be displayed on the display 26. The device 20 continues to determine its location on an ongoing basis whilst it is operational.

In the embodiment of FIG. 1, the internal flash memory 37 stores the boot loader and Linux operating system for the navigation device, and also stores the applications that are used by navigation device. Data that is used by those applications, including map data, may be stored on the data storage device 2. The operating system and applications are installed in the volatile memory of the device upon start-up.

An initial set of data, including the bootloader, a Linux operating system kernel, file system and other components, is stored on the internal flash memory 37 during a production or packaging process and is referred to as the factory image.

In the case of the data storage device 2, read only data files, such as maps or voice files are placed in the FAT partition. Files that are writeable by the application application software of the navigation device are placed on the Ext3 partition. Examples of such files include configuration files and patch files that contain amendments or additional data relating to map files.

The largest files stored in the data storage device are usually the map files, and such map files may exceed 1 GB in size. If the navigation device 20 includes a text-to-speech engine, there may also be large voice files (up to 512 MB each) stored in the data storage device 2. Amendments may be made by the user to map features either by amending the corresponding map file or by storing data in an additional amendment file.

As data storage devices (for example SD cards) usually come in discrete sizes, there is usually space left for the user to store additional data. The user may use that space to store, for example, an additional map (e.g. Eastern Europe), a bigger map (new features or more countries), map overlays, or music and photos.

Figure 4:
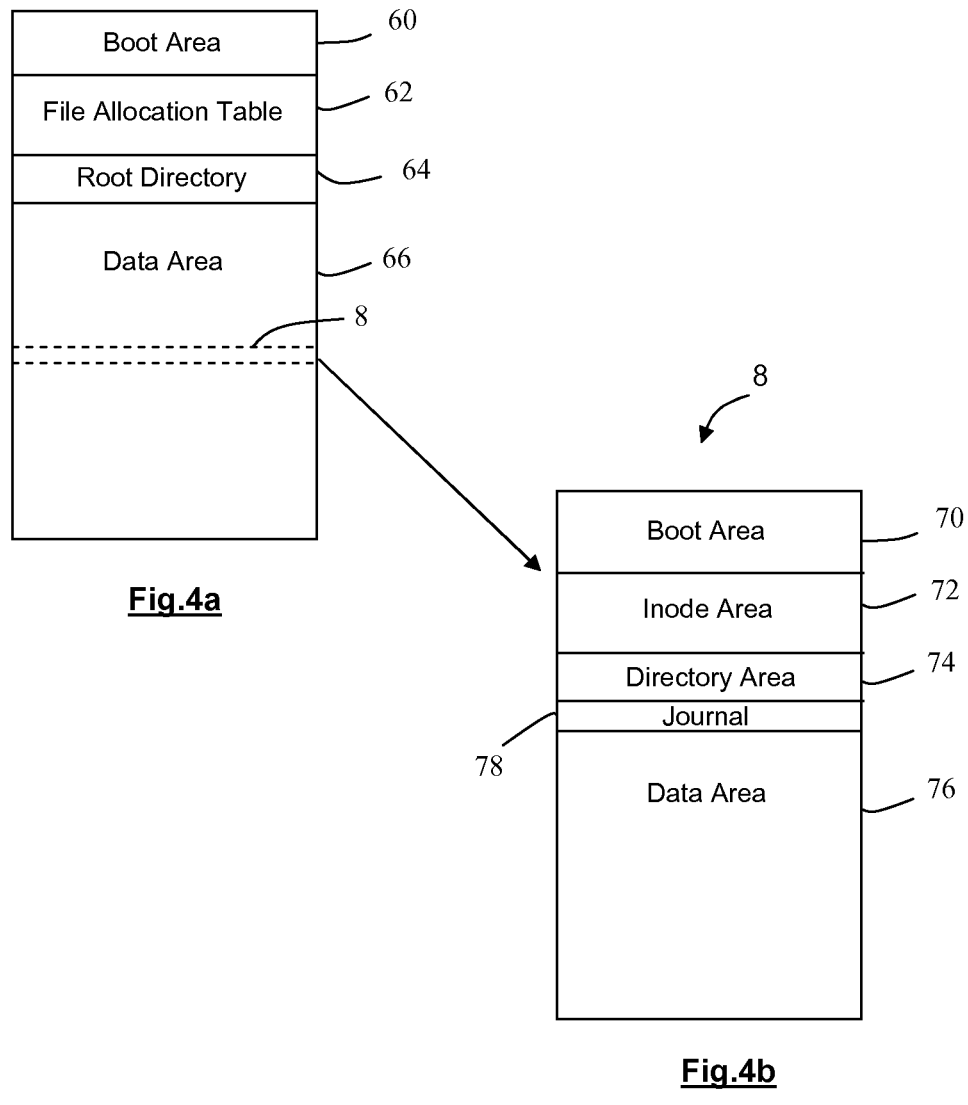
FIG. 4a is a schematic illustration of the data structure of the data storage device.
FIG. 4b is a schematic illustration of the structure of an Ext3 file system included in the data storage device.

FIG. 4a illustrates schematically the data structure of the data storage device 2. The data storage device 2 is formatted in accordance with the FAT file system and comprises a boot area 60, a file allocation table 62, a root directory 64, and a data area 66.

The boot area 60 comprises basic information concerning the file system, for example cluster and sector sizes, and the size and location of the file allocation table 62 and the root directory 64. The file allocation table 62 comprises entries identifying and locating the clusters in the data area corresponding to each stored file, and identifying any free clusters. The root directory 64 stores metadata representative of various properties of each stored file, for example a file name, extension, one or more attributes (for example whether a file is read-only) and time stamps representative of time of creation and/or modification. The data area 66 is where the data included in the files is actually stored. The data is stored in fixed size clusters. Typically, each file is stored in a set of non-contiguous clusters selected from the clusters that were free at the time the data was stored.

One of the files stored in the data area 66 is the loopback file 8 shown in FIG. 1. As mentioned above, the loopback file comprises an Ext3 file system, which in turn comprises a plurality of data and/or other files 10. The structure of the loopback file is illustrated schematically in FIG. 4b.

The Ext3 file system included in the loopback file 8 comprises a boot area 70, an inode area 72, a directory area 74, and a data area 76. The Ext 3 file system in this example comprises 15,000 blocks each of size 1 KB (providing a total of 15 MB, in two groups).

The boot area 70 contains basic information concerning the Ext3 file system, for example cluster and sector sizes, and the size and location of the inode area 72 and the directory area 74. The inode area 72 contains metadata in the form of inodes representative of properties of the files stored in the Ext3 file system, for example, file type, file size, one or more attributes (for example whether a file is read-only, or access privileges), and time stamps representative of time of creation and/or modification, if required, as well as the identity and location of the clusters in the data area 76 containing the file data. Each inode is 128 bytes in size, and extended attributes are not used. The directory area 74 contain file names and associated inode identifiers, identifying the inode or inodes associated with each file name. The data area 76 contain the file data.

The Ext3 file system also includes a journal 78, which is used to journal data and/or metadata during the writing of data and metadata by the file system. The journal is 1 MB in size (1024 blocks) in the example of FIG. 1.

Figure 5:
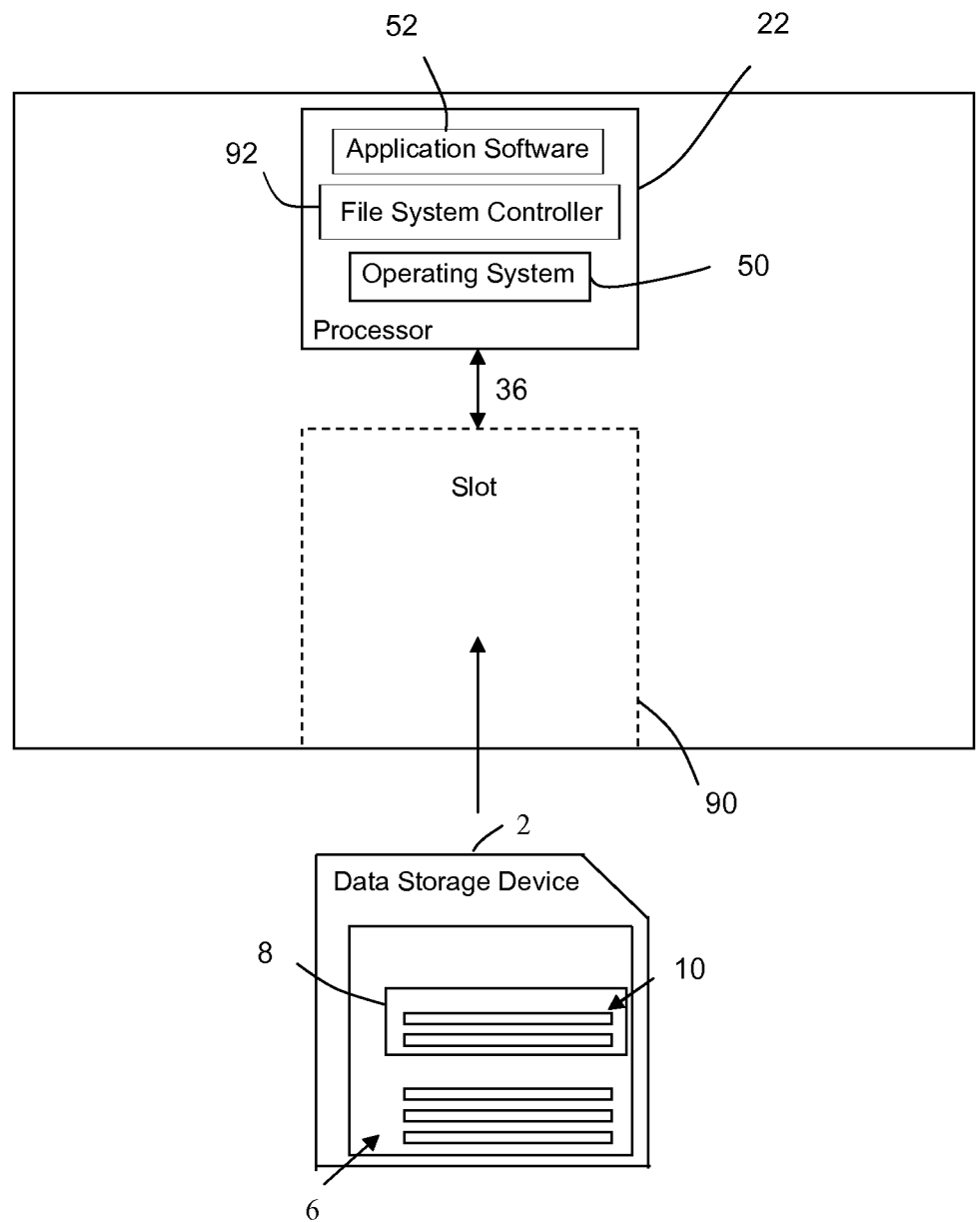
FIG. 5 is a schematic illustration of the installation of the data storage device of FIG. 1 in the navigation device of FIG. 2.

File system operations that may be performed by the navigation device 20 on the file systems of the data storage device 2 are now described in more detail in relation to FIG. 5.

FIG. 5 shows schematically the navigation device 20, the processor 22 and a slot 90 in the navigation device 20 for removable installation of the data storage device 2. In operation, the operating system 50 and the application software 52 are installed and operated at the processor 22. A file system controller 92 is also installed and operated at the processor 22.

The file system controller 92 is in operative communication with both the application software 52 and, via the operating system 50, with the FAT and Ext3 file systems on the data storage device. The file system controller 92 is operable to mount the file systems on the data storage device and to provide an interface to the file systems for the application software 52. The file system controller 92 is also operable to manage requests for reading and writing of data to the file systems of the data storage device 2, and other file system operations, and to partition data between the file systems.

The Linux operating system 50 installed on the navigation device 20 is configured to include drivers for both the FAT and Ext3 file systems. The file system controller 92 uses those file system drivers to mount the FAT and Ext3 file systems of the data storage device 2. In alternative embodiments, using different operating systems, the operating system kernel may not include all necessary file system drivers (for example the Windows and Mac OS X operating systems do not include Ext2/3 drivers). In that case, such file system drivers can be provided by the file system controller 92 itself.

The file system controller 92 uses the unionfs file system service, which is operable to create a new mountpoint for the logical union of two or more file systems. In this case, unionfs is used to combine the FAT file system and the Ext3 file system stored on the data storage device 2. For example, the FAT filesystem (/mnt/sdcard) and the Ext3 file system (/mnt/loop) can be combined by the file system controller 92 using the function # mount -t unionfs -o dirs=/mnt/loop:/mnt/sdcard=ro none /mnt/sdcard.

The application software 52 thus has a single, combined view of the FAT and Ext3 file systems, and is not aware of the partitioning of data between the file systems. The combination of the FAT and Ext3 file systems can be referred to as a virtual file system (VFS).

The file system controller 92 uses a loop device function that identifies the loop file 8 on the data storage device 2, makes it accessible as a block device and enables the file system controller 92 to mount the Ext3 file system included in the loop file 8. Loop device functionality is provided in the Linux operating system. The loop file 8 has a default name (for example "loop") or location, and the default name or location is stored in the boot file and made available to the file system controller 92 during the boot up procedure. A RAM disk image is included in a file that is loaded and executed during the boot up procedure, and the RAM disk image includes a shell script that is executed on start up and that includes the default name.

Once the file system controller 92 has mounted the FAT and Ext3 file systems, the application software is able to perform read, write and other file system operations by sending system calls to the file system controller 92.

In the case of a read operation, the file system controller 92 is configured to receive a request for a file present in the combined file system from the application software and to search in both the FAT and Ext3 file systems for the requested file, beginning with the Ext3 file system.

In the case of a write operation, for example modifying an existing file or storing a new file, the file system controller 92 is configured to write always to the Ext3 file system rather than the FAT file system. By ensuring that all file writes are to the Ext3 file system, it can be ensured that the system is power fail safe by using the journaling capabilities of the Ext3 file system, as discussed in more detail below. If a power failure occurs during a write operation then the data to be written can be recovered from the Ext3 journal. Furthermore, by ensuring that all file writes are to the Ext3 file system, long file name functionality can be provided to the user without having to use the long file name components or functionality of the FAT file system (or other FAT file system). A read and write operation is illustrated in overview in the flowchart of FIG. 6.

The use of the loopback file in the embodiment of FIG. 1 affects the normal operation of the Ext3 journal. Before considering the sequence of operations during a write operation to the Ext3 file system via the loopback arrangement of the embodiment of FIG. 1, the sequence of operations in relation to a normal write operation using a known Ext3 file system are described in relation to FIG. 7, which shows in overview the sequence of components used in such a write operation.

A write operation to a file in a standard Ext3 file system is firstly requested, in the user space or application layer. A system call is provided to the virtual file system, and file operations (file_operation) relating to the write operation are then performed at the Ext3 file system layer.

The write operation is broken down at the file system layer using Ext3 file system functions into a compound transaction comprising multiple atomic operation handles (atomic_operation_handle) in the address space of the file system (address_space_operations).

According to the Ext3 file system, each transaction is firstly written to a journal before being written to its final destination (the set of clusters at the data storage device level selected by the operating system kernel). At any time the journal may include several transactions, but only one of them is in an active (T_Running) state in which it can accept new atomic operation handle requests from the Ext3 file system.

In normal operation of an Ext3 file system, a transaction may be committed to its final destination in response to expiry of a predetermined interval (for example, 5 seconds) from the creation of the transaction, in response to there being less than a predetermined amount of space left in the journal or a transaction being greater than a predetermined size (for example, if the transaction is greater than ¼ the size of the journal) or in response to a synchronisation (sync) command.

Once a transaction has been successfully written to its final destination, it can subsequently be deleted or overwritten from the journal.

If there is a failure to write to the final destination then the complete transaction is present in the journal and can be recovered by replaying the journal. If there is a failure during the writing to the journal then the journal entry is not complete and is ignored. The Ext3 journal is typically of limited size and so large data writes are usually broken up into small transactions.

The writing of transactions to the journal and to the final destination must pass through the page cache of the operating system, which manages the input and output operations (block I/O) operations performed at the hardware/device level. The Ext3 file system has ordering constraints for at least some journal operations. For example, the flag that indicates a transaction is complete should be written before the complete transaction is written to disk. In the case of known Ext 3 systems the journaling layer determines when and which pages are written back, and ensures that pages are written back in the correct order to maintain proper operation of the Ext3 journaling by use of hooks in the page cache.

Figure 7:
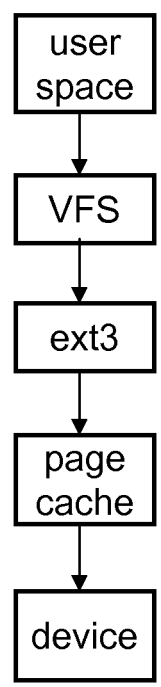
FIG. 7 is an illustration in overview of the sequence of components used in a write operation to a known Ext3 file system.
Figure 8:
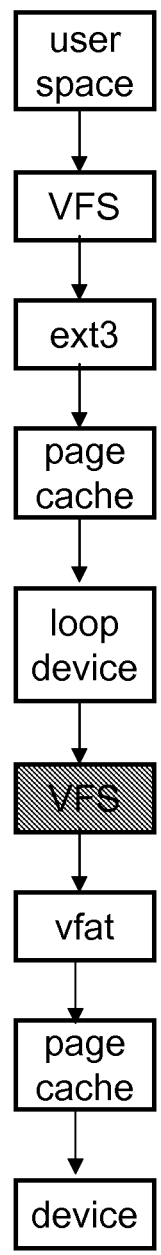
FIG. 8 is an illustration in overview of the sequence of components used in a write operation to the Ext3 file system in the loopback arrangement of the embodiment of FIG. 5.

Having described a known Ext3 write operation, the sequence of operations during a write operation to the data storage device 2 via the loopback arrangement of FIG. 1 is now described in relation to FIG. 8. The sequence of operations is similar to that for known Ext3 systems, as described in relation to FIG. 7, up to the point where data passes to the operating system page cache from the Ext3 device layer, subject to certain modifications. Instead of being written back from the page cache in volatile memory to the data storage device 2, the pages representing the data to be written are passed from the page cache to the FAT driver in the kernel 50, which is responsible for writing the data into the loopback file 8 in the FAT file system. The data are then returned from the FAT file system layer to the page cache of the operating system for performance of block I/O operations to write back the pages to the data storage device 2 at the hardware level.

The page cache may be a writeback (write behind) cache and, by default, pages may not be flushed immediately. Instead, in a default mode of operation a writeback daemon (pdflush) may determine what pages to write back from the cache to the data storage device without ordering constraints. Typically the writeback daemon would write back pages to a device in dependence on the physical proximity of the clusters in which they are to be stored at the device, and not in transaction order, which makes the system potentially not power fail safe. For example, there is a significant power fail hazard if a transaction complete flag is written to the data storage device before the corresponding complete transaction is written to the journal on the data storage device. In that case, if there is a power fail after the transaction complete flag is written but before the complete transaction is written, the journal replay process will conclude that the transaction has been validly written to the data storage device when it has not.

The Ext3 journaling layer cannot take direct control of the page cache write back to the device in the loopback arrangement of FIG. 1. Thus, in order to ensure that the writeback of data from the page cache to the device is performed in the correct order to maintain proper operation of the Ext3 journaling (and thus power fail safe operation), the page cache of the FAT file system is configured to operate in synchronous mode, so that each page is flushed from the FAT file system page cache before any more data is passed to the page cache.

It has been found in some circumstances correct operation of the synchronous mode of the FAT file system requires that a FAT write function is used instead of writing directly to the page cache. If data is written directly to page cache without using the FAT write function, as may be the case for some default modes of operation of a loopback device, then the synchronous mode of operation may not operate correctly and the data may not immediately be written from the FAT page cache to the data storage device (for example, as the O_SYNC flag may not be checked in such circumstances). In order to address that issue, the system is configured so that the FAT write function is always used in writing to the loop file.

The Ext3 file system is configured to operate so that a sync command is provided when a file is closed. That reduces the chances that a journal is committed when a file is not completely written. As the files that are written are generally small and open, written and closed quickly the chances of triggers other than the sync command to commit the transaction occurring are small. In general, the system is configured to open only one file at a time and to synchronise the Ext3 file system when the file has been updated, before opening the next file.

In response to the sync command, the Ext3 file system data passes from the Ext3 layer to the page cache, and from there via the FAT file system write operation to the pages in the page cache that are associated with the loop file. As the FAT file system is configured to operate in synchronous mode, all modified pages are flushed from the FAT file system page cache before any more data is written to the page cache. Thus, by suitable use of the sync command in the Ext3 file system, operation of the FAT file system in synchronous mode, and use of the FAT write command it can be ensured that correct operation of Ext3 journaling can be maintained in the loopback arrangement.

By default, the FAT file system updates the modification time for a file whenever a file is modified. In the case of the loopback file 8, power-fail-safe writing could be compromised if every update of the loopback file 8 were to cause a further, non-power-fail safe write to the FAT administration to update the modification time. Therefore, in the described embodiment the modification time recordal feature of the FAT file system is disabled by selection of the appropriate option under the Linux operating system.

In some circumstances, the application software 52 may wish to write to a file present on the FAT file system. In such circumstances, the file system controller 92 copies the file to the Ext3 file system, and ensures that it takes precedence over the redundant version of the file stored on the FAT file system. An administration file is stored in the data area 76 and maintains a record of redundant FAT files, under control of the file system controller 92. Redundant files can be deleted periodically when the navigation device is connected to a personal computer 100 based on records in the administration file.

In another mode of operation, modifications to a read only file stored in the FAT file system are stored as a separate modification file in the Ext3 file system. In that case the administration file maintains a record linking the read only file and the modification file. The file system controller 92 reads both the read only file and the modification file in response to a read request, combines data from both files and provides a modified version of the file.

In the embodiment of FIG. 1, the FAT file system functions included in the operating system exclude functions that support long file names in the FAT file system. The files in the FAT partition are usually specified to have only short names. If a directory has a long file name then all files in that directory (even if they have short file names) are included in the Ext3 file system, as the FAT file system cannot contain the higher level directory name without long filename support.

Files written to the data storage device 2 by the file system controller 92 are written to the Ext3 file system rather than the FAT file system, and so long file system functionality can be provided to the user despite an absence of long file name components in the FAT file system.

In an alternative embodiment, the FAT file system functions included in the operating system include functions that support long file names. In that case, the factory image still includes only short file names in the FAT file system, and the file system controller 92 stores files to the Ext3 file system rather than the FAT file system. However, the FAT long file system functions can be useful if the data storage device 2 is accessible by external, third party applications or devices.

For example, in some embodiments the data storage device 2 may be connected to another computer via a USB connection, and accessed by standard music or other media software. Such other applications or devices may have access only to FAT drivers, and in those circumstances files (for example music or image files, such as MP3 or JPEG files) added by those other applications or software may be written to the FAT partition, and it may be desirable to support long file names. The writing of files by such other applications or devices is non-power fail safe.

In another embodiment or mode of operation, the file system controller 92 is configured to write files to either the FAT partition or the Ext3 partition in dependence on the length of the file name. For example, the file system controller 92 may be configured to write all files that have a file name longer than the 8.3 format to the Ext3 partition.

Figure 6:
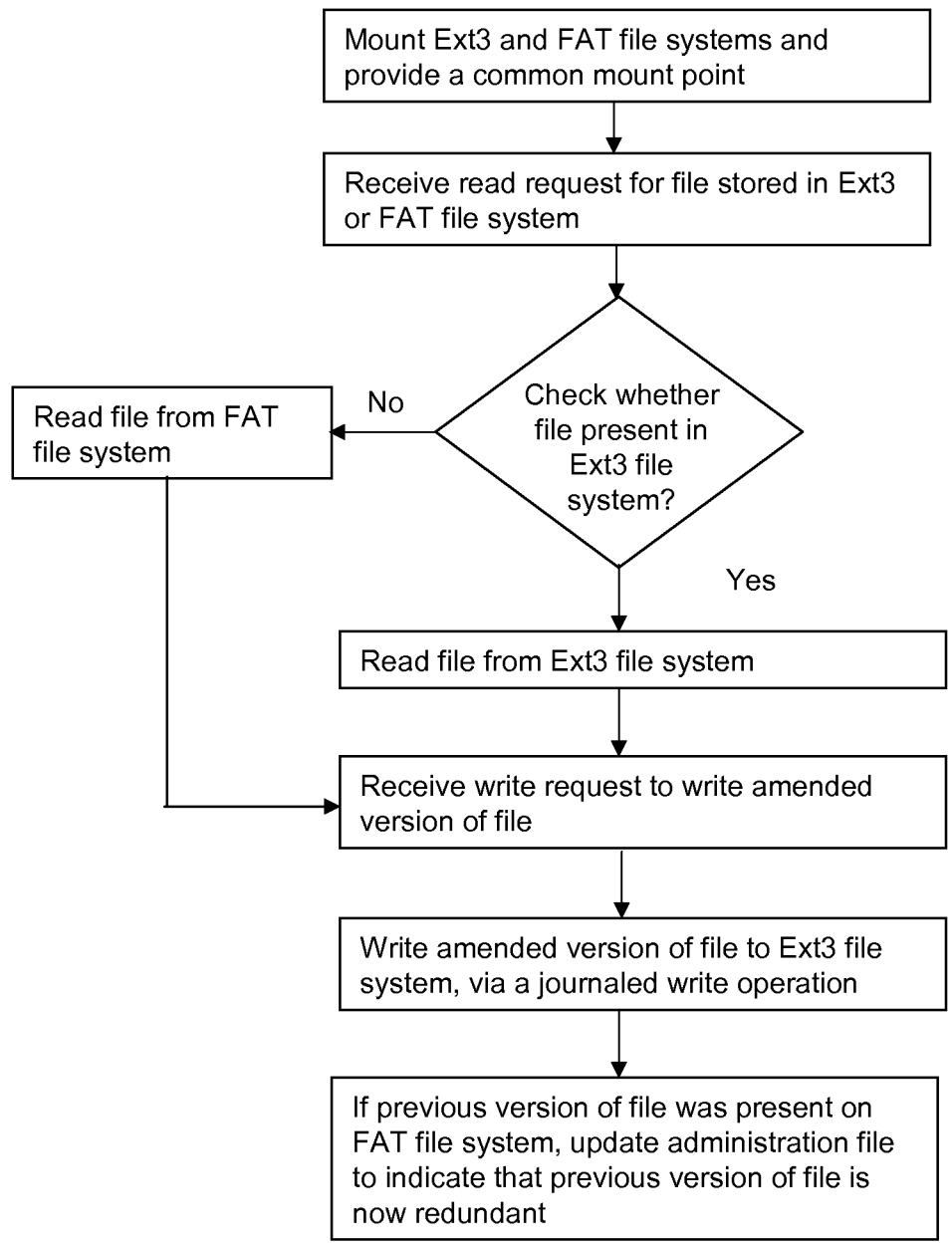
FIG. 6 is a flowchart illustrating in overview a read operation and subsequent write operation.

The description above concerning FIGS. 6 to 8, relates to read, write or other file system operations performed by the file system controller 92 at the navigation device 20 in response to requests from application software 52 at the navigation device 20. The system can also include software and/or a file system controller on a personal computer, which can also perform file system operations on the data storage device 2.

The electronic device 20 can be connected to a personal computer 100, for example via a USB connection, and communication between the personal computer 100 and the data storage device 2 can be via the electronic device. Alternatively, the data storage device 2 can be connected to the personal computer 100 via a card reader device, for example a USB card reader.

Figure 9:
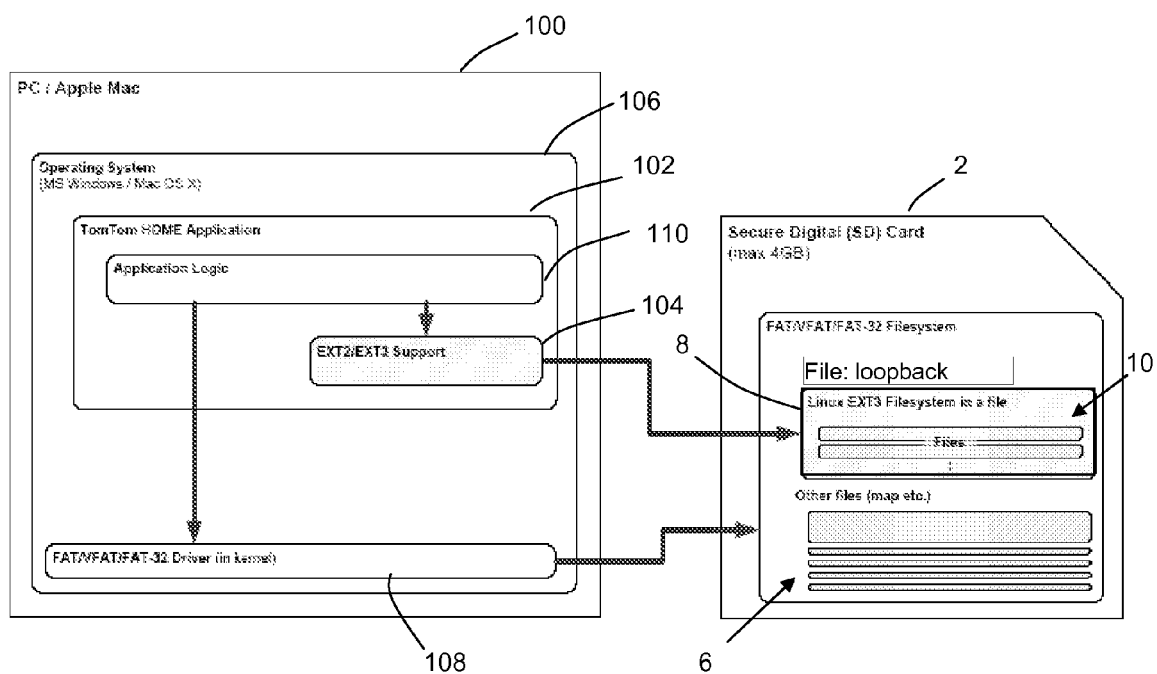
FIG. 9 is a schematic illustration of the data storage device in communication with a personal computer.

A connection via a USB cable between the data storage device 2 and a personal computer 100 including suitable application software 102 and a suitable file system controller 104 is illustrated in FIG. 9. Communication between the storage device 2 and the personal computer 100 is established using standard techniques.

The personal computer 100 includes a standard operating system 106 (for example, MS Windows or Mac OS X) that includes a FAT/VFAT/FAT-32 driver 108 in its kernel. The application software 102 includes an application logic layer 110 that comprises various modules providing application functions. The application software 102 is able to perform various functions relating to the navigation device 20, including viewing maps and planning routes, updating map and other data, and downloading and analysing or forwarding usage data from the navigation device 20.

When the navigation device 20 is connected to the personal computer 100, at least some of the functionality of the navigation device 20 is suspended and, for example, route planning, mapping and navigation functions are not available to the user via the navigation device. The user may instead perform functions relating to the navigation device 20 via the functionality provided by the application software 102 running on the personal computer 100. A user may add new data or update, amend or delete data existing stored on the data storage device 2 of the navigation device 20.

The FAT/VFAT/FAT-32 driver 108 included in the operating system 106 of the personal computer can be used to control read, write and other file system operations of the FAT file system on the data storage device 2. The operating system does not include drivers for the Ext-3 file system, and Ext2/3 drivers are instead provided by the file system controller 104 included in the application software. The file system controller 104 controls reads and writes to the Ext-3 file system.

In the embodiment of FIG. 9, journaling of data writes to the Ext3 file system by the personal computer 100 is not used, although it is used in variants of the embodiment. As journaling is not used, the file system controller 104 can treat the Ext3 file system of the data storage device 2 as an Ext2 file system for the purposes of read and write operations. The Ext2 file system is substantially the same as the Ext3 file system, but does not provide journaling capabilities. If the journal of an Ext3 file system is empty it can safely be mounted as an Ext2 file system. Before doing so however, the file system controller 104 confirms that the Ext3 file system on the data storage device 2 has previously been dismounted correctly, and there are no outstanding incompatibilities between journal and data entries. It does so by reading the appropriate flag in a superblock of the Ext3 file system. If the file system controller 104 determines from the flag that the file system has not been dismounted correctly, it performs a file system check using the e2fsck function, and recovers any outstanding journal entries before mounting the file system as an Ext2 file system.

In an alternative embodiment, the personal computer includes a Linux operating system that supports both FAT and Ext3 file systems, and the personal computer software includes a file system controller that is the same or similar to the file system controller 92 of the navigation device 20. In that embodiment, the file system controller at the personal computer mounts and performs file system operations on the FAT and Ext3 file systems as described in relation to FIGS. 6 to 8, including maintaining journaling functionality for the Ext3 file system.

In alternative embodiments, the data storage device 2 is permanently installed in the navigation device 20 rather than being a removable memory device, such as an SD card.

In the embodiments described above, files in the FAT file system have a maximum size of 4 Gb, and so if a power-fail-safe file system is provided in a single file of the FAT file system, the size of that power-fail-safe file system is limited. Therefore, in other embodiments, the power-fail safe file system is provided across two or more files (for example, two or more loopback files). By providing, for example, an Ext3 or other file system in two or more files in the FAT file system, the Ext3 or other file system can have a maximum size that is not restricted by the 4 Gb file size limit of the FAT system. The power-fail-safe file system can be configured so that the two or more files appear to be concatenated.

In other embodiments, the power-fail-safe file system includes all of the files used by an electronic device (for example a navigation device). Thus, in one example, a file system, for example the FAT file system, may include no files other than a file or set of files containing a further power-fail-safe file system, for example an Ext3 file system. In that example, all file writes may thus be to the Ext3 file system (including for example writes of user downloads, such as MP3 or other media files).

Figure 10:
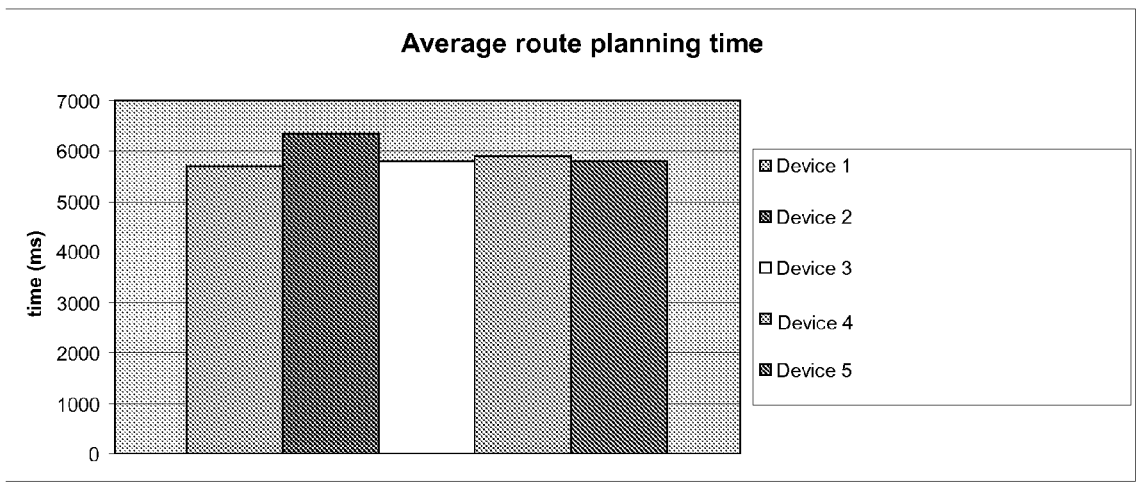
FIG. 10 is a graph of average route planning time obtained for devices having different file system arrangements.

The effect on performance of the navigation device 24 of different file system arrangements have been measured. A set of 12 route planning jobs for routes within the Benelux region were executed 10 times each for navigation devices having different files system arrangements, data storage devices, and loopback or non-loopback arrangements. The average route planning time for each navigation device was measured and is plotted in FIG. 10.

Details of the different navigation device are provided below:-
Device 1
boot: from internal flash
internal flash formatting: FAT32, 4 kB clusters
loop device: on internal flash, ext3, 4 kB blocks, 4 MB journal, 128 MB in size
SD-card: not present
unionfs: not used
map: Benelux, from FAT32, no unionfs Device 2
boot: from internal flash
internal flash formatting: FAT32, 4 kB clusters
loop device: on internal flash, ext3, 4 kB blocks, 4 MB journal, 128 MB in size
SD-card: not present
unionfs: all files through unionfs, FAT32 as read only, loop device as rw
map: Benelux, from FAT32 through unionfs
Device 3
boot: from internal flash
internal flash formatting: FAT32, 4 KB blocks
loop device: on internal flash, ext3, 4 kB blocks, 4 MB journal, 128 MB in size
SD-card: not present
unionfs: all files except map, FAT32 as read only, loop device as rw
map: Benelux, from FAT32, without unionfs
Device 4
boot: internal flash
internal flash formatting: ext3, 4 kB blocks, 4 MB journal
loop device: on SD-card, ext3, 4 kB blocks, 4 MB journal, 128 MB in size
SD-card: FAT32, 4 kB clusters
unionfs: all files, FAT32 as read only, loop device as rw
map: Benelux, from FAT32 on SD-card, through unionfs
Device 5
boot: from internal flash
internal flash formatting: FAT32, 4 KB blocks
loop device: on internal flash, ext3, 4 kB blocks, 4 MB journal, 128 MB in size
SD-card: not present
unionfs: all files, FAT32 as read only, loop device as rw
map: Benelux, from FAT32, through unionfs It can be seen from the graph of FIG. 10 that acceptable performance by the navigation device 20 is obtained regardless of whether data is partitioned between Ext3 and FAT32 file systems, whether a loopback file is used, or whether unionfs is used. The graph relates to read performance rather than write performance, and the use of a journaled file system in the loopback arrangement has a more significant impact on write times than on read times. However, for electronic devices such as navigation devices reading speed is of more importance than writing speed, and any impact on the writing speed is offset by the benefits of providing power-fail safe operation.

The embodiments described in relation to FIGS. 1 to 9 each include a data storage device that includes both a FAT file system and an Ext3 file system in a loopback file in the FAT file system. The invention is not limited to the combination of FAT and Ext3 file systems, and in other embodiments different combinations of file systems, for examples different combinations of power-fail-safe and non-power-fail-safe file systems, are provided. By providing for at least two different types of file system, it can be ensured that the most appropriate file system can be used for different operations or data, whilst at the same time ensuring compatibility with existing devices or operating systems.

The file system controller described herein may be implemented as a software module. Alternatively or additionally the file system controller may be implemented as a combination of file system components, settings and/or drivers. The file system controller may include components at both of the application and operating system levels. The file system controller may be implemented in the data storage device, the electronic device or a personal computer, and/or may comprise a combination of software or hardware components across the data storage device, the electronic device and/or the personal computer.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst embodiments described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination. Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A data storage system comprising:
a data storage device that comprises a first file system of a first type, wherein at least one file stored in the first file system comprises a second file system of a second, different type; and
a file system controller for controlling file system operations performed on the file systems, the file system controller being configured to write data to the second file system in a power-fail-safe manner, wherein the file system controller is configured to issue a write command for the first file system in response to each closure of a file for storage in the second file system.

2. A data storage system according to claim 1, wherein the file system controller is configured to write to the second file system in response to a request received by the file system controller for write operations to the first or second file systems.

3. A data storage system according to claim 1, wherein the file system controller is configured to redirect write operations intended for the first file system to the second file system.

4. A data storage system according to claim 1, wherein the at least one file comprising the second file system comprises a loopback file.

5. A data storage system according to claim 1, wherein the file system controller is configured to operate so that a recoverable copy of data to be written to the second file system is maintained until the data has been successfully written to the second file system on the data storage device.

6. A data storage system according to claim 1, wherein data is written to the second file system by writing data to the at least one file in the first file system that comprises the second file system, and the file system controller is configured to operate so that the ordering of data to be written to the second file system is maintained when writing to the at least one file in the first file system.

7. A data storage system according to claim 1, wherein the second file system is a journaled file system and the file system controller is configured to maintain the ordering of journal operations of the second file system when writing to the at least one file comprising the second file system.

8. A data storage system according to claim 7, wherein in operation journal transactions comprising journal data and metadata are written to a journal in the second file system, and the file system controller is configured to control writing to the at least one file comprising the second file system so that for each journal transaction the journal data is written to the journal before journal metadata representative of the completion of the journal transaction is written to the journal.

9. A data storage system according to claim 1, arranged to operate so that data is written to the first file system on the data storage device via a page cache, and the first file system is configured to operate so that each amended page in the page cache that is to be written to the first file system and/or second file system is flushed from the page cache to the data storage device before any further amended pages to be written to the first file system and the second file system are written to the page cache.

10. A data storage system according to claim 1, arranged to operate so that data is written to the first file system on the data storage device via a page cache, and the file system controller is configured to ensure that there is no queue of two or more pages to be written to the first or second file system in the page cache.

11. A data storage system according to claim 1, wherein the data storage device is for use in a navigation device.

12. A data storage system according to claim 1, wherein the first file system, of the first type, is a non-power fail safe file system.

13. A data storage system according to claim 1, wherein the first file system comprises a FAT-based file system and/or the second file system comprises an Ext3 file system or a successor to the Ext3 file system.

14. A data storage system according to claim 1, wherein the file system controller comprises mounting means for mounting the first file system and the second file system, and the mounting means is configured to provide a combined mounting point for the first file system and the second file system.

15. A method of storing data by a data storage device, the method comprising:
  providing, in the data storage device, a first file system of a first type, providing at least one file in the first file system that comprises a second file system of a second, different type,
  saving data to the second file system, by a file system controller, in a power-fail-safe manner, and
  issuing a write command, by the file system controller, for the first file system in response to each closure of a file for storage in the second file system.

16. A non-transitory computer program product comprising computer readable instructions that are executable to cause a computer to perform a method according to claim 15.

* * * * *